United States Patent [19]

Grohmann

[11] Patent Number: 4,938,455

[45] Date of Patent: Jul. 3, 1990

[54] LIQUID-JET CUTTING TORCH

[75] Inventor: Paul Grohmann, Maria-Enzersdorf, Fed. Rep. of Germany

[73] Assignee: Messer. Griesheim GmbH, Fed. Rep. of Germany

[21] Appl. No.: 321,918

[22] Filed: Mar. 13, 1989

[30] Foreign Application Priority Data

Mar. 19, 1988 [DE] Fed. Rep. of Germany ....... 3809292

[51] Int. Cl.⁵ .............................................. B23K 7/10
[52] U.S. Cl. .................................... 266/48; 239/132.3
[58] Field of Search .......................... 266/48; 148/9 R; 239/132.3, 132

[56] References Cited

U.S. PATENT DOCUMENTS

| 2,976,941 | 3/1961 | Horton | 266/48 |
| 3,901,445 | 8/1975 | Chang | 239/132.3 |
| 4,216,908 | 8/1980 | Sakuri et al. | 239/132.3 |
| 4,765,846 | 8/1988 | Grohmann | 266/48 |

Primary Examiner—S. Kastler
Attorney, Agent, or Firm—Connolly & Hutz

[57] ABSTRACT

A liquid-jet cutting torch for cutting with liquid oxygen, includes a cutting-oxygen line surrounded all the way to the outlet of the cutting nozzle by a cooling-medium line, by a vacuum insulation and by a cooling-water casing.

5 Claims, 2 Drawing Sheets

LIQUID-JET CUTTING TORCH

BACKGROUND OF INVENTION

When cutting with a high-pressure, liquid-oxygen jet as is known, for example, from West German published patent application DE-OS 35 43 657, the pressure of the oxygen, which is kept at the boiling point in the tank, is raised to 500 bar by means of a high-pressure pump. The pressure at the outlet of the cutting torch is regulated by means of a relief valve.

In order to eliminate the heat resulting from friction, it is necessary to cool down the oxygen with a cooling medium, for instance, liquid nitrogen. In this context, the abovementioned West German published patent application only proposes cooling the oxygen in the feed lines.

SUMMARY OF INVENTION

The task of the invention is to create a liquid-jet cutting torch in which the liquid jet can be cooled as close to the cutting nozzle as possible.

With the proposed double-cooling arrangement (liquefied cooling medium with a low-boiling point and cooling water) with vacuum insulation between them a cutting torch is created in which the liquid jet is still sufficiently cold when it comes into contact with the workpiece, and it is protected against overheating and splashing cuttings.

THE DRAWINGS

FIG. 1 shows a cutting torch with an internal cutting nozzle in accordance with this invention; and FIG. 2 shows a cutting torch with an external cutting nozzle in accordance with this invention.

DETAILED DESCRIPTION

Figure 1:
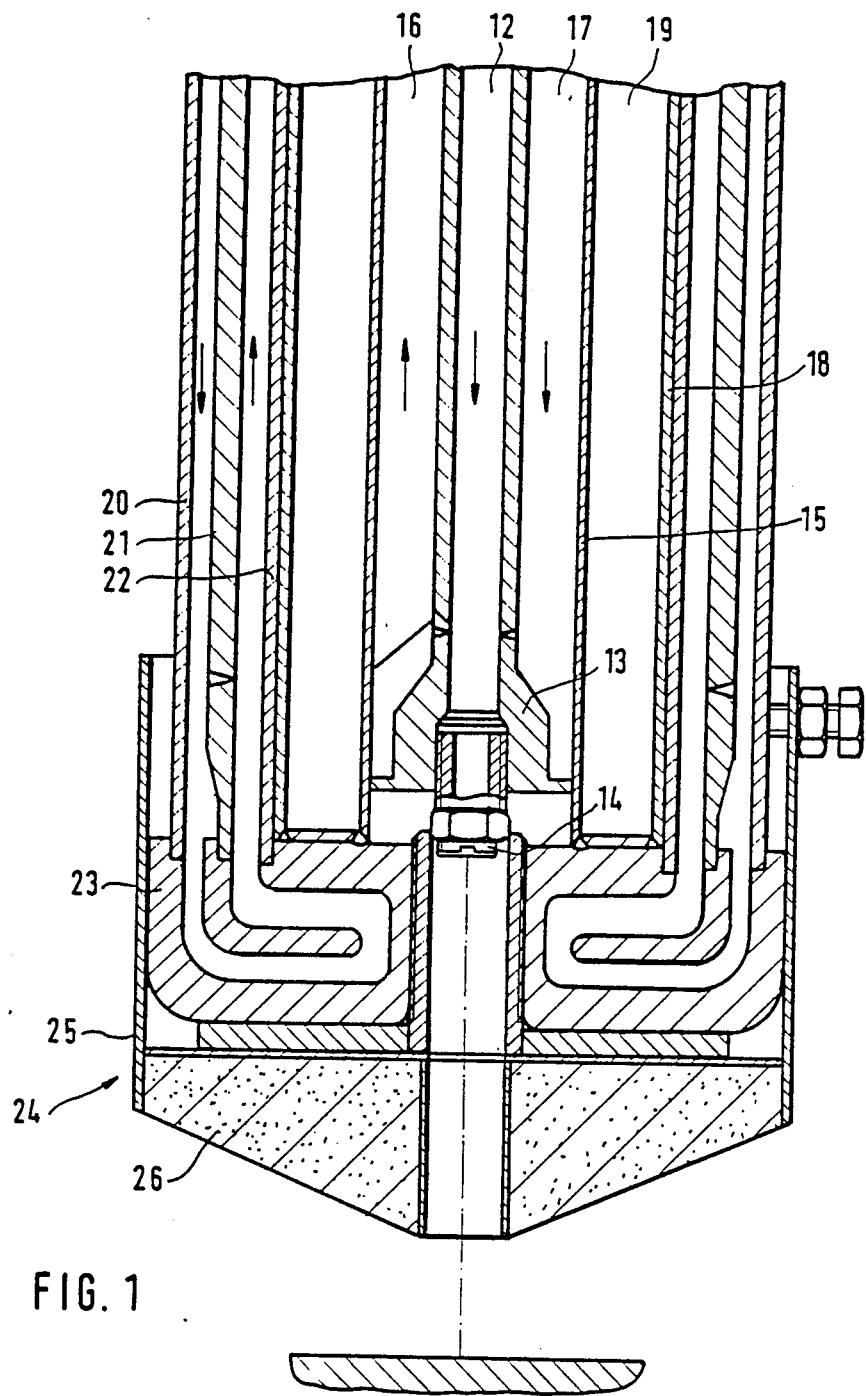
Figure 2:
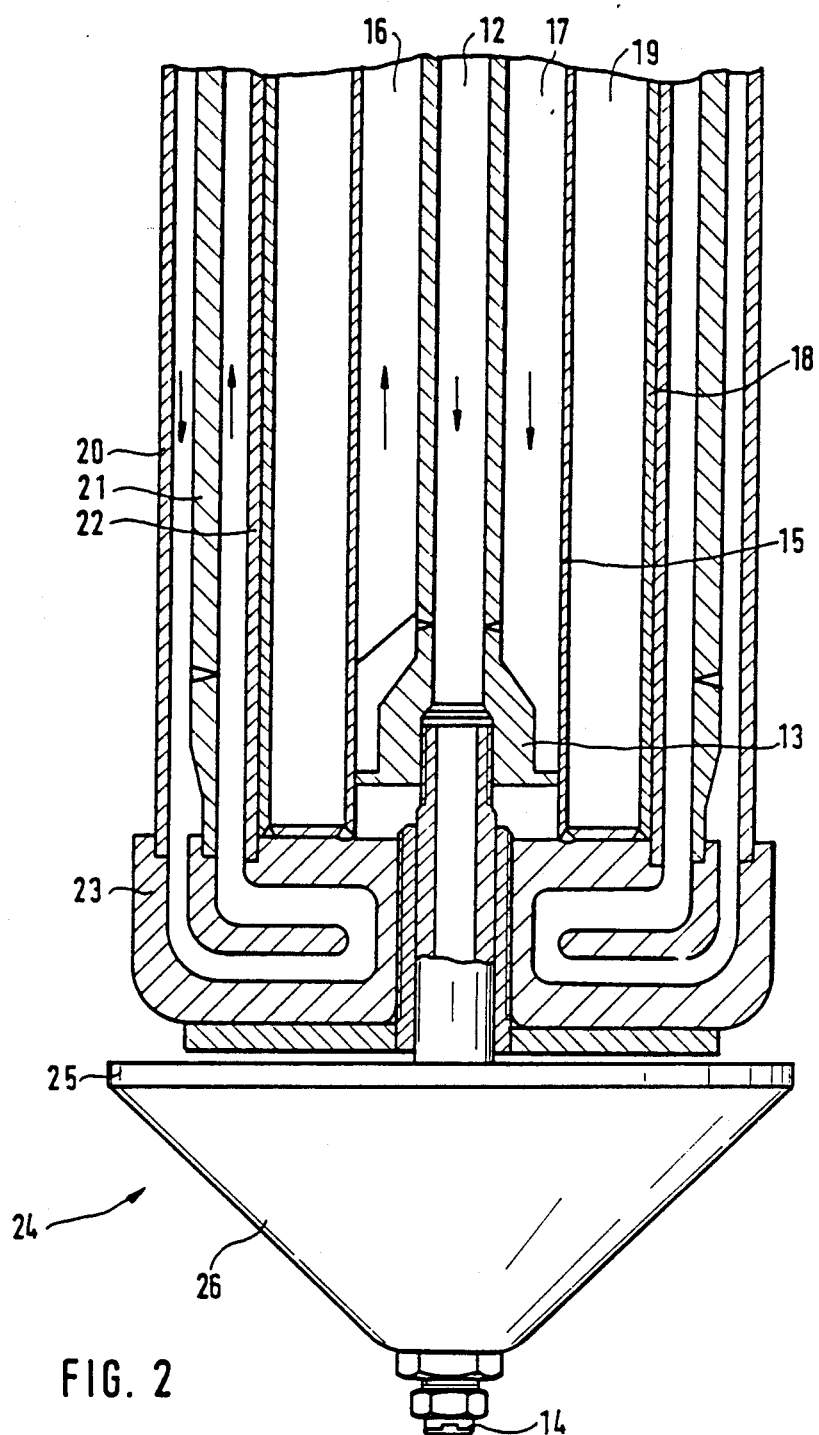

The liquid-jet cutting torches depicted in FIGS. 1 and 2 have a high-pressure line for liquids 12 that is positioned in the center of the torch, onto which a mouthpiece 13 is welded to allow the attachment of various cutting nozzles 14. The highpressure line 12 and the mouthpiece 13 are concentrically surrounded by a pipe 15, which forms the line for a liquefied cooling medium with a low-boiling point, preferably liquid nitrogen. The line 16 which admits the cooling medium is located in the annular passage 17.

The pipe 15 is surrounded by another concentric pipe 18, which serves to hold the vacuum insulation, preferably vacuum superinsulation 19, and which also protects the high-pressure liquid against heat radiation.

A cooling water casing made of stainless-steel pipes 20, 21, 22 equipped with a cooling head 23 made of cast copper is slid over the pipe 18 as a protection against overheating and splashing cuttings. The copper cooling head 23 serves to enclose the wide mouthpiece 13 and to remove the cooling water.

In order to avoid damage to the copper cooling head 23 caused by cuttings that splash back, the cooling head 23 is protected by a covering cap 24 made of stainless steel 25 and a fire-proof compound 26.

In the case of the cutter 10 shown in FIG. 1, the cutting nozzle 14 is located inside the cutter.

In the preferred embodiment of the cutter according to FIG. 2, the cutting nozzle 14 is located outside. Moreover, the fire-proof compound of this cutter is shaped like a cone. The exposed cutting nozzle 14 is protected by the emergent oxygen against cuttings that might splash back. Cooling the nozzle 26 by the liquid-oxygen cutting jet intensifies the protective effect.

The conical form of the fire-proof lining has the advantage that it is subject to far less strain than the embodiment according to FIG. 1. Nevertheless, the protective effect on the copper cooling head remains the same. In this manner, it is possible to design a cutting head with excellent stability.

What is claimed is:

1. In a liquid-jet cutting torch, the improvement being in that a centrally positioned liquid-jet line having a mouthpiece, a cutting nozzle attached to said mouthpiece, an inner pipe concentrically surrounding said line to comprise means to admit and remove a liquefied cooling medium with a low-boiling point, an intermediate pipe concentrically around said inner pipe, said intermediate pipe comprising a vacuum insulation concentrically surrounding said inner pipe, and an outer cooling-water casing surrounding said pipe.

2. Liquid-jet cutting torch according to claim 1, characterized in that a cooling head is attached to said cooling-water casing.

3. Liquid-jet cutting torch according to claim 2, characterized in that said cooling head is equipped with a covering cap with a fire-proof compound.

4. Liquid-jet cutting torch according to claim 3, characterized in that said cap is conically shaped.

5. Liquid-jet cutting torch according to claim 3, characterized in that said cutting nozzle is located outside said covering cap together with said fire-proof compound.

* * * * *